United States Patent [19]
Moore

[11] Patent Number: 5,845,268
[45] Date of Patent: Dec. 1, 1998

[54] PARKING MANAGEMENT SYSTEM

[76] Inventor: Steven Jerome Moore, 9 Sonoma Rd., Cortlandt Manor, N.Y. 10566

[21] Appl. No.: 581,891

[22] Filed: Jan. 2, 1996

[51] Int. Cl.[6] .............................. G06F 17/60; B60Q 1/48
[52] U.S. Cl. ........................ 705/418; 340/932.2; 368/6; 368/7; 368/90; 705/13
[58] Field of Search ................................... 235/375, 382; 340/932.2, 934, 825.3, 825.31, 825.35; 364/464.28; 368/6, 7, 90, 92; 395/213; 705/13, 418

[56] References Cited

U.S. PATENT DOCUMENTS

| | | | |
|---|---|---|---|
| 2,535,472 | 12/1950 | Wood | 368/6 |
| 2,575,650 | 11/1951 | Alexander | 368/6 |
| 2,652,551 | 9/1953 | Gumpertz et al. | 235/47 |
| 2,945,341 | 7/1960 | Griffin et al. | 368/7 |
| 3,018,615 | 1/1962 | Minton et al. | 368/7 |
| 3,114,128 | 12/1963 | Ljungman et al. | 340/932.2 |
| 3,141,292 | 7/1964 | Bailey et al. | 368/6 |
| 3,150,754 | 9/1964 | Greene, Jr. | 194/225 |
| 3,166,732 | 1/1965 | Ljungman et al. | 340/932.2 |
| 3,194,005 | 7/1965 | Schalow | 368/90 |
| 3,324,647 | 6/1967 | Jedynak | 368/6 |
| 3,535,870 | 10/1970 | Mitchell | 368/6 |
| 3,930,363 | 1/1976 | Rubenstein | 368/6 |
| 3,999,372 | 12/1976 | Welch et al. | 368/6 |
| 4,183,205 | 1/1980 | Kaiser | 368/90 |
| 4,379,334 | 4/1983 | Feagins, Jr. et al. | 364/464.28 |
| 4,812,805 | 3/1989 | Lachat et al. | 340/825.05 |
| 4,876,540 | 10/1989 | Berthon et al. | 340/932.2 |
| 4,908,617 | 3/1990 | Fuller | 340/932.2 |
| 5,029,094 | 7/1991 | Wong | 364/464.28 |
| 5,153,586 | 10/1992 | Fuller | 340/932.2 |
| 5,351,187 | 9/1994 | Hassett | 395/213 |
| 5,402,475 | 3/1995 | Lesner, Jr. et al. | 379/106.11 |
| 5,614,892 | 3/1997 | Ward, II et al. | 340/870.02 |
| 5,617,942 | 4/1997 | Ward, II et al. | 194/217 |
| 5,648,906 | 7/1997 | Amirpanahi | 364/464.28 |

*Primary Examiner*—Edward R. Cosimano

[57] ABSTRACT

There is disclosed a computer-based parking system for improving the apprehension of parking violators. Such parking system comprises one or more electronic-based parking meters or devices having a means for recognizing and storing electronically information pertaining to the identity of the parker and may include one or more parking space monitors electronically connected to said electronic-based parking machines for detecting occupancy of and movement from a parking space.

7 Claims, 11 Drawing Sheets

PARKING MANAGEMENT SYSTEM

BACKGROUND OF INVENTION

1. Field of Invention

The present invention relates generally to an improved automated parking management system. In particular, it relates to a computer-based parking system for improving the apprehension of parking violators.

2. Brief Description of the Prior Art

The parking meter is a ubiquitous device found in nearly every city in the country. Both municipalities and private enterprises widely employ these devices to raise revenues.

Until very recently, parking meters were generally all mechanical-based. Nearly everyone in this country is familiar with a silver meter which accepts coins through a covered slot, and which by a mechanical pointer means connected to a timing mechanism informs the parker, and the meter attendant, how much time is left before a parking violation occurs. While these meters have served their purpose well for a good part of this century, they suffer from a number of disadvantages. For one, these meters generally accept only coins, and often accept only one type of coin. Many a person has pulled into a parking space guarded by such a meter to find that they did not have the coins needed to operate the meter. For another, these meters in general are able only to cover one parking spot. The latter results in the need to purchase a plurality of meters to cover each possible parking space.

In a large part due to these and other disadvantages, mechanical-based parking meters are gradually being replaced by electronic-based parking meters and systems. An electronic parking meter of the prior art is disclosed in U.S. Pat. No. 4,379,334 to Feagins. These meters are capable of covering a plurality of parking spaces with a single parking meter. These meters generally include a clock, a coin and/or bill acceptor, electronic processing circuits and a printer. In the older electronic-based parking meter systems the parker inserted money into the parking meter, received a receipt upon which an expiration time appeared from the meter, and then returned to the parker's car to place the receipt in the windshield of the car. In newer electronic-based systems, however, the parker keys in an code identifying the parking space in which the parker's car has been parked, or the vehicle's license plate number, along with depositing money into the meter. The meter stores the expiration time (based on the amount paid) in its memory correlated to the parking space or license plate number permitting the parker to proceed without having to place the receipt in a clearly visible position in the vehicle. A plurality of electronic parking meters can be networked together so as to provide input to a single central station as shown in U.S. Pat. Nos. 5,029,094 and 5,402,475.

Ordinary parking meters of both the mechanical type and electronic-type permit "piggy-backing" off the parking time left by a previous parker. That is, a large number of parkers leave a parking space with allotted parking time still on the meter. Such parking time is typically added to the non-violation parking time of a subsequent parker in the same space. In order to resolve this problem, numerous sensor-coupled mechanical and electronic-based parking meters have been proposed. By way of example, U.S. Pat. No. 3,018,615 shows a parking meter including a device which magnetically or electronically detects the presence or absence of a vehicle in the assigned parking space, and upon removal of the vehicle from the parking space and arrival of a subsequent vehicle, resets the parking meter. U.S. Pat. No. 3,324,647 shows a parking meter including a proximity detector which resets the parking meter time indicator when the vehicle in the assigned parking space is removed. U.S. Pat. No. 3,999,372 discloses a parking meter with a sonic transmitter and receiver for resetting the meter when the parked car is removed. U.S. Pat No. 3,535,870 shows a parking meter controller which transmits periodic burst of ultrasonic energy and a receiver for receiving such energy after reflection from a vehicle in a controlled parking space. U.S. Pat. No. 4,043,177 discloses the use of a photosensor for detecting movement and resetting the parking meter to zero. Other such sensor-coupled resetting parking meters are shown in, for example, U.S. Pat. Nos. 2,535,472, 2,575,650, 2,652,551, 2,945,341, 3,018,615, 3,114,128, 3,141,292, 3,150,754, 3,150,754, 3,166,732, 3,194,005, 3,930,363, 4,043,117, and 4,183,205. Sensor-coupled parking devices have also been proposed for use in detecting unauthorized parking in restricted use parking stalls, as for example, in U.S. Pat. No. 4,908,617 and 5,153,586.

A problem associated with reset devices which detect reflected radiation, is the detection of erroneous radiation which prevents the device from resetting when it should. A further problem associated with such reset devices is pranksters who often cover over the transmitter or receiver, or both, in an attempt to prevent the device from receiving reflected radiation. U.S. Pat. No. 4,835,425 proposes a solution to this problem in disclosing a reset device for a parking meter which minimizes the sensitivity of the device to ambient radiation by directing the detector element on a meter pole at a specified angle, and which permits normal parking meter operation when the radiation path is blocked.

While providing many advantages over mechanically-based parking meters, both the older and newer electronic-based parking machine systems suffer from a number of disadvantages shared by their mechanical cousins. For one, neither system provides a non-labor intensive means for determining whether a parking violation has occurred. Under either system, a person is required to check whether a vehicle is parked in the spot that has expired. Further, the vehicle that is sitting in an expired spot must be identified by manual means usually encompassing taking down vehicle identification numbers, such as the license plate number, and placing a ticket on the windshield of the car. Non-payment of the ticket encompasses the time consuming task of determining the registrant of the car, a person who often is not guilty of the violation itself.

A recent innovation in the motor vehicle art has been the bar-coding, or memorialization by magnetic strip means, of driver identification information on motor vehicle licenses. Heretofore, personal identification coding and sensor technology have not been used to aid in the apprehension of overtime parkers.

SUMMARY OF THE INVENTION

It is an object of the present invention to provide an improved parking payment system.

It is a further object of the present invention to provide a improved parking payment system that enables parking violators to be detected more easily and efficiently.

These and other objects are attained in accordance with one aspect of the present invention directed to a electronic-based parking system comprising one or more electronic-based parking meters or devices having a means for recognizing and storing electronically information pertaining to the identity of the parker. Such system may further comprise one or more parking space monitors electronically connected to said electronic-based parking machines.

In an embodiment of the invention, an electronic-based parking meter is equipped with an electronic reading device. The parker places a personalized medium such as a credit card, bar-coded license, a license with a digitized picture, or other electronically identifiable card into the reading device. Such device reads the encoded personal information on the card and such information is stored in the random access memory (RAM) or similar data storage means via a bus or other communication means for communicating information. The RAM is coupled to a processor for processing the personal information and computationally coupling it to the parking space number, expiration time (a time determined by how much is paid), and/or license plate information which a parker is prompted to input into the parking meter by means such as an alphanumeric input keypad on the parking meter. Such "status information" is stored in a data storage means, such as a magnetic disk and disk drive. If the card inserted is a credit card or debit card, the processor may be programmed to debit the card placed in it for the parking time chosen. Charge information may be verified via telecommunications means with the credit or debit card company by means well-known in the art. In the alternative, the parker may be prompted to insert legal tender into a tender slot within the machine.

The parking meter of this embodiment also includes a circuit for reading time/data contained in the memory in order to determine violation status. Time data in the status code is read periodically and a comparing circuit compares the time data as read with present time data as provided by a clock. If the present time data is later than the expiration time data the space information is stored on another sector of the data storage device and/or stored in another data storage device, as violation space information, for access by a meter operator or central station operator.

A further aspect of the present invention is directed a parking meter for easing the identification of parking violators comprising: a means disposed within the parking meter for electronically reading and storing personal identification information; an input means disposed within said parking meter for inputting information pertaining to the location of a parked car; a processing means disposed within the parking machine electronically coupled to the means for electronically reading personal identification information and the input means, for coupling the personal identification information with the information pertaining to the location of the parked car. The parking meter may further comprise an output means for obtaining the processed coupled information.

Also disclosed is a parking system for easing the identification of parking violators comprising: one or more parking meters; a means disposed within the parking meters for electronically reading and storing personal identification information; one or more displacement monitors electronically coupled to the parking meters for recording displacement in a parking space; a processing means disposed within the parking meters electronically coupled to the means for reading personal identification information and the displacement monitors, for coupling the personal identification information with the information pertaining to displacement within a particular parking space.

The parking system of the present invention may further comprise one or more displacement monitors for detecting displacement from a parking space, or the occupancy status of a parking space. Displacement monitors may comprise a triggering system and displacement data processing means. The triggering system is devised so as to detect both the occupancy (e.g. 1) and non-occupancy (e.g. 0) of a parking space. The displacement data processing means is programmed to process information pertaining to a change of occupancy to unoccupancy, and vice-versa, and to transmit a digitalized data stream pertaining to the displacement and the parking space number to the parking meter. In order to account for vehicles re-positioning themselves in a particular parking space, the displacement monitor data processing means may be programmed such that a displacement signal is not sent to the parking meter if two or more contrary displacements are received within a specified period of time.

A change of vacancy from the unoccupied state to the occupied state causes the displacement data processing means to send a digitalized status code to the parking meter relating to the identification of the parking space, the displacement change, and may include the time of the displacement change. Upon receipt of payment for parking at the meter, and input of the corresponding parking space for which payment is made, the parking meter confirms occupancy of the inputted space and credits such space a certain non-violation parking time. The meter further prompts the parker for input of a electronically-readable identification medium, such as a credit card or bar-coded license. If receipt of payment and the information requested is not received within a certain time frame, the parking meter stores the parking space information in a data storage area as "non-authorized parker" data. The identity of the unauthorized parker may be determined by manually inspecting the spot or automatically by visual monitors pre-programmed to examine different parking spaces upon receipt of unauthorized parker input. If the information request is provided by the parker, the meter stores the identification of the parker together with the parking space and parking violation time as a status code. Receipt of a signal corresponding to a change of vacancy from occupied to unoccupied may be used as the precipitation for comparison of actual time against non-violation time stored in the status code with respect to the parking space from which the displacement signal emanates. Status code information is deleted if an occupied to unoccupied displacement signal corresponding to the parking space is received by the parking meter prior to the violation time associated with the parking space. If such signal is received after the violation time associated with the parking space, then the parking meter stores at least the personal identification portion of the status code as "overtime parker" code. As can be appreciated, the time of departure of the vehicle from the space could also be addended to the status code and the later saved as the "overtime parker" code. The stored personal identification portions of the status code corresponding to violators (e.g., "overtime parkers" and "non-authorized parkers") are used to ascertain the identity and address of the violator. The parking system of this embodiment may also include monitoring of the violation information stored in the parking meter by a central station by means of telecommunication lines. Violation information may be inspected either manually or automatically to discern the personal information encoded therein. Such information may be converted into information for mailing a ticket by comparing the personal information encoded within the violation status code with standard databases such as TRW, accessible credit card company databases, and/or motor vehicle department databases. If the address of the driver is optically scanned into the parking machine, the latter information may be all that is necessary to issue a ticket.

The triggering system of the present invention may comprise any of the many triggering systems known in the art, including various sensors. For example, the displacement monitor's triggering system may be a simple contact style switch placed on or beneath the parking space. In this embodiment, the displacement processor recognizes the change of a closed circuit to an open circuit, and vice versa, as a displacement, one or both of these types of displacements being transmitted to the parking machine processor for processing. Likewise, the displacement monitor's triggering system may be a wave-based monitor of a type well-known in the art. In one embodiment, a low intensity sound wave is directed from a pole monitor to the parking space. Interference with the beam path and/or re-institution of the beam path is detected as a displacement. One or both of these types of displacements are transmitted to the parking machine processor for processing.

In one embodiment of the invention, the triggering system comprises one or more wave-based generators and/or receivers positioned above a parking space. Output of displacement data in this embodiment may be dependent upon receipt by the displacement monitor of a plurality of activation signals, that is, an activation of a plurality of triggering systems.

In yet another embodiment of the present invention there is disclosed a parking space monitor for ascertaining the vacancy status of a parking space comprising: a signal generating means for generating a signal; a signal detecting means for receiving the signal from the signal generator; a processor means electronically connected to the signal detecting means for coupling parking space identification information with vacancy status information. The parking space monitor may further comprise: a plurality of signal generating means and signal detecting means disposed superior to the parking spot, the monitoring system requiring receipt of the signal by two or more signal detecting means for recordation of a displacement within the parking space.

In one embodiment of the invention, the electronic reading device is a credit card reading device of a type well known in the art.

In yet another embodiment of the invention, the electronic reading device is a scanning device for digitizing information. For example, the device could be used to digitize information bar-coded on a driver's license.

BRIEF DESCRIPTION OF THE DRAWINGS

For a more complete understanding of the objects of the present invention, the Detailed Description of the Illustrative Embodiments thereof is to be taken in connection with the following drawings, in which.

DETAILED DESCRIPTION OF THE ILLUSTRATIVE EMBODIMENT OF THE PRESENT INVENTION

Figure 1:
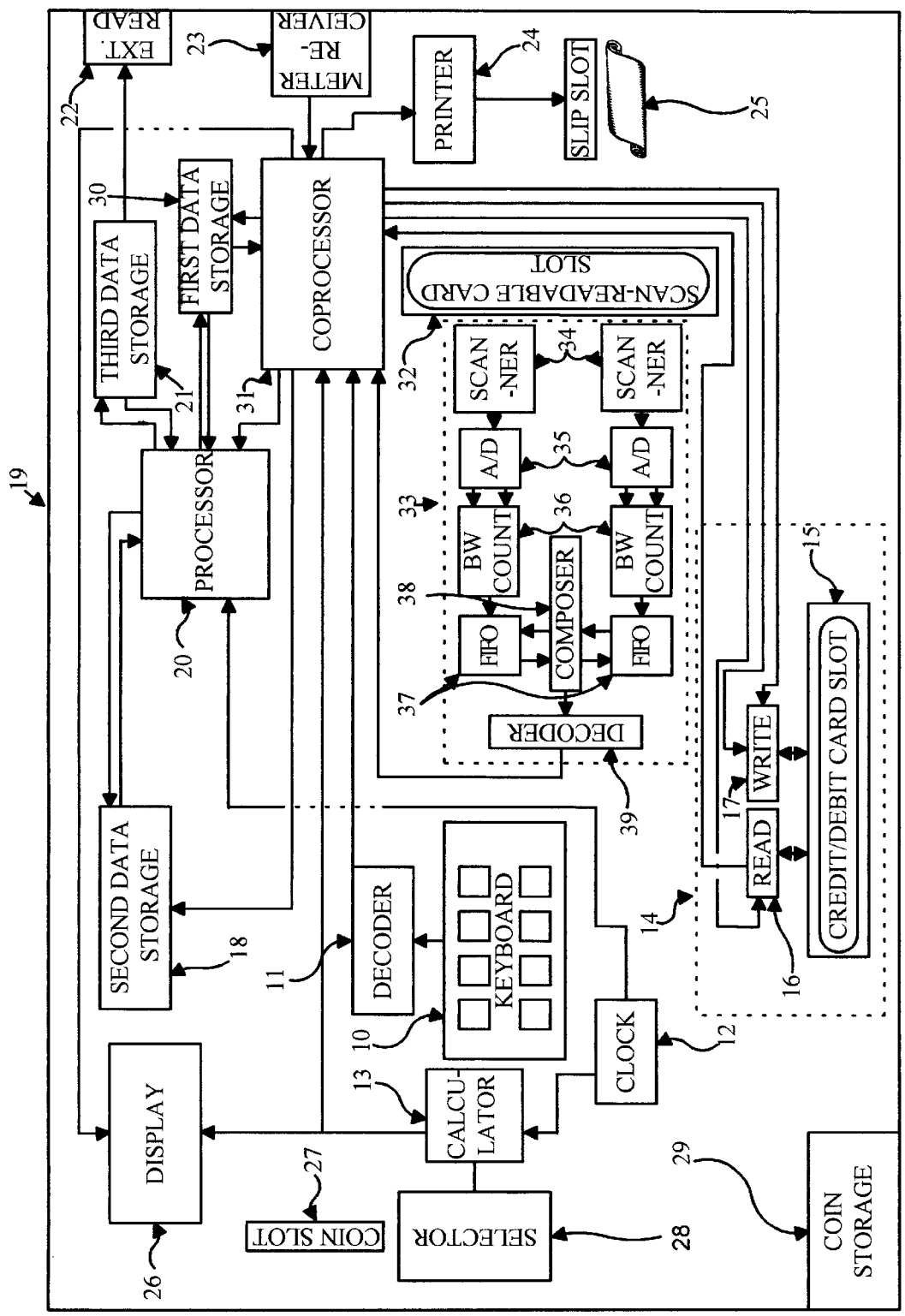
FIG. 1 is a block diagram of an embodiment of a parking meter of the present invention.

Now referring to FIG. 1, there is shown a block diagram of an embodiment of a parking machine of the present invention. Parking machine 19 includes a slot 27 through which coins are inserted, the amount deposited determining the non-violation parking time. The coins inserted into slot 27 are checked by a coin selector 28 which determines the denomination of the inserted coins. A calculator 13 determines the time at which paid-up parking expires on the basis of the total amount of money inserted through the slot 27 and the present time as provided by a clock circuit 12. The expiration time is displayed on a display panel 26 and expiration time is input into coprocessor 31. After passing through the coin selector 28, the coins are stored in a coin box 29. Parking machine 19 further includes printer 24 suitable for dispensing a printed slip 25 to the parker with the slip indicating the amount paid and the expiration time and being used as a receipt. Parking machine 19 further includes a keyboard 10 for enabling a driver, prior to inserting money into slot 27 to key in data suitable for identifying the parked vehicle. This parking identification data includes the parking space number in which the vehicle has been parked and may include the license number of the vehicle parked therein. The data inserted via keyboard 10 is decoded by decoder 11 and sent for processing to coprocessor 31. Various elements illustrated in FIG. 1 are conventional and operate in a manner known to those of ordinary skill in the art. Thus, in the interest of brevity, further description of these elements, their interaction and their operation is not provided.

Parking machine 19 further comprises identification medium reading means, such as magnetic card readable means 14 and scan readable means 33. Magnetic card readable means 14 permits reading of magnetically encoded cards such as credit cards, debit cards, parking cards or drivers' licenses. Magnetic card readable means 14 comprises slot means 15 and read means 16 and may further include write means 17 for debiting a card such as a parking card. Scan readable means 33 may comprise a conventional bar code reader, as depicted, comprising scanners 34, analog to digital converters 35, bar width counters 36, FIFO registers 37, composers 38 and decoders 39. Scan readable means 33 is positioned so as to read a scan-readable card inserted into scan-readable card slot 32. Scan readable means 33 and/or magnetic card readable means 16 send personal identification data to coprocessor 31 for coprocessing with parking identification data received from decoder 11 and expiration time data received from calculator 13 as to form status code data. Parking machine 19 further comprises receiver means 23 for receiving digital input with respect to the displacement within a parking space. Receiver means 23 is coupled to coprocessor 31 which stores input related to an unoccupied to occupied displacement in first data storage means 30. Coprocessor 31 confirms that status code pertaining to the parking space inputted on keyboard 10 with respect to the occupancy of the parking space by verifying an unoccupancy-to-occupancy displacement code for the particular space in first data storage 30. Upon confirmation of the status code, coprocessor 31 deletes the unoccupancy-to-occupancy displacement code with respect to the parking space from first data storage 30 and stores the confirmed status code in second data storage 18. Coprocessor 31 is further coupled to processor 20 providing occupied-to-unoccupied displacement input to the same which is in turn coupled to third data storage 21 and there through to external read 22, through which data stored in third data storage 21 may be obtained.

Figure 8A:
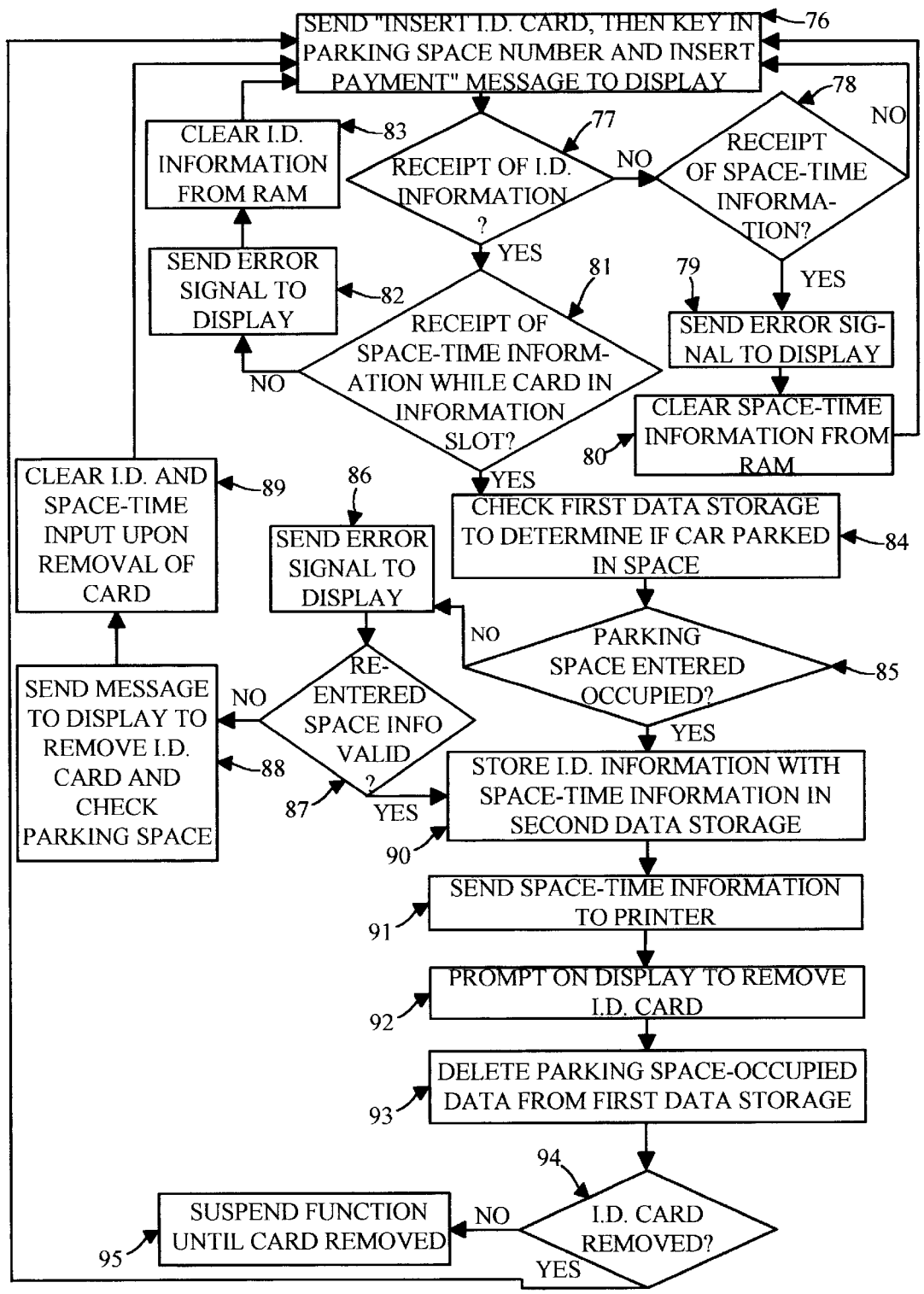
FIGS. 8a–8b is a flowchart of an operational routine utilizable in the co-processor of the embodiment set forth in FIG. 1.
Figure 8B:
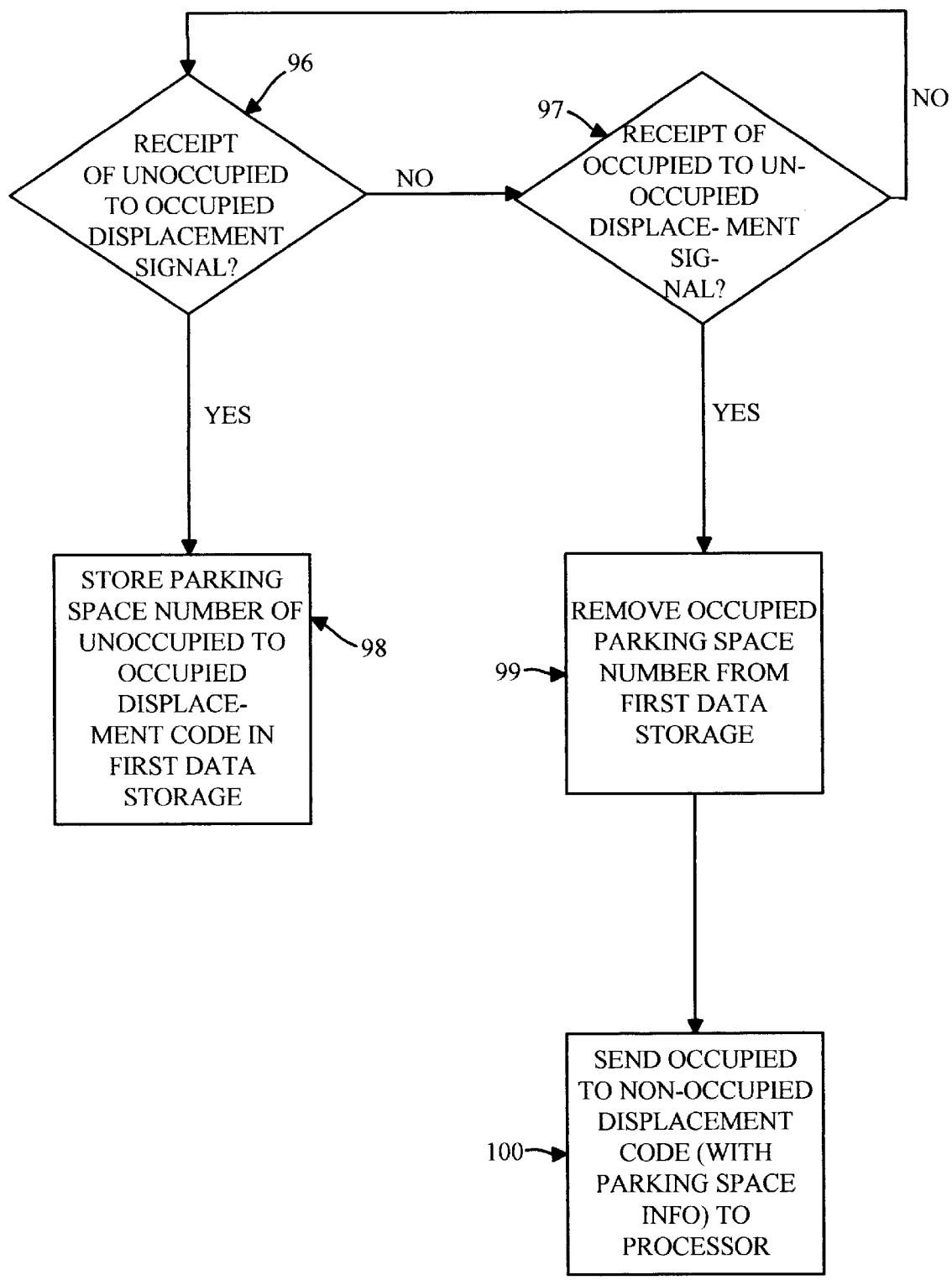

FIG. 8a depicts a flowchart of an operational routine by which coprocessor 31 may prompt a parker to provide personal identification data, parking space identification data and payment, and by which it may validate a parking space inputted by a parker by means of keyboard 10 by comparing to occupied space data stored in first data storage means 30. As illustrated in FIG. 8a, at Step 76 a parker is prompted for required input at the meter by prompt message "Insert I.D. Card, then Key in Parking Space Number and Insert Payment" which is sent to display. At Step 77 the coprocessor determines if there is receipt of I.D. information as requested. If there is no receipt of I.D. information, the coprocessor determines if there is receipt of space-time information at Step 78. If space-time information is not received then the prompt message is redisplayed on the display (Step 76). If there is receipt of space-time information at Step 78, however, then there is sent an error signal to display (Step 79) and the space time information is cleared from RAM (Step 80), and the prompt message is redisplayed (Step 76). On the other hand, if there is receipt of I.D. information, the coprocessor subsequently determines if there is receipt of space-time information while the I.D. card was within the card slot (Step 81). If the space-time information was not inputted while the card was in the information card slot, the processor sends an error signal to display (Step 82) and the I.D. information is cleared from RAM (Step 83). On the other hand, if there was receipt of space-time information while the card was in the information card slot (Step 81) the coprocessor subsequently inquiries the first data storage to determine if a car is parked in the space for which input was entered (Steps 84, 85). If no car is determined to be parked in the space for which input was entered, then the coprocessor sends an error signal to display (Step 86) and the parker prompted to reenter the space information. The re-entered space information is determined to be valid or not at Step 87. If the space information which is re-entered is not valid the processor sends a message to the display asking the parker to remove the parker's I.D. card and to check the space which the parker is entering (Step 88), and the I.D. information and space-time input is cleared upon removal of such card (Step 89). If the space information which is entered initially by the parker does correspond with a parking space which is occupied, the I.D. information with the space-time information is stored in second data storage (Step 90). Subsequently the space-time information is sent to the printer (Step 91), a prompt is sent to the display for the parker to remove the I.D. card (Step 92) and the parking space-occupied data from the first data storage is deleted (Step 93). A check is subsequently performed to determine if the I.D. card is removed (Step 94). If the I.D. card has not been removed, function of the meter is suspended until the card is removed (Step 95). If the I.D. card is removed, the prompt message "Insert ID. Card, then key in Parking Space Number and Insert Payment" is displayed. FIG. 8b sets forth a flowchart of an operational routine which may be followed by coprocessor 31 upon receipt of displacement data from receiver means 23. As illustrated in FIG. 8b, at Steps 96 and 97 there is determined whether there is receipt of an unoccupied to occupied displacement signal, or an occupied to unoccupied displacement signal, respectively. If an unoccupied to occupied displacement signal is discerned, the parking space number correlating with such displacement is stored in first data storage (Step 98). If an unoccupied to occupied displacement is not discerned, the processor is prompted to search for a receipt of an occupied to unoccupied displacement signal (Step 97). If such a signal is received, the occupied parking space number from the first data storage is removed (Step 99) and the occupied to non-occupied displacement code (with parking space information) is sent to the processor (Step 100). If there is no receipt of an occupied to unoccupied displacement signal (Step 97), the processor is prompted to search for receipt of an unoccupied to occupied displacement signal (Step 96).

Figure 9A:
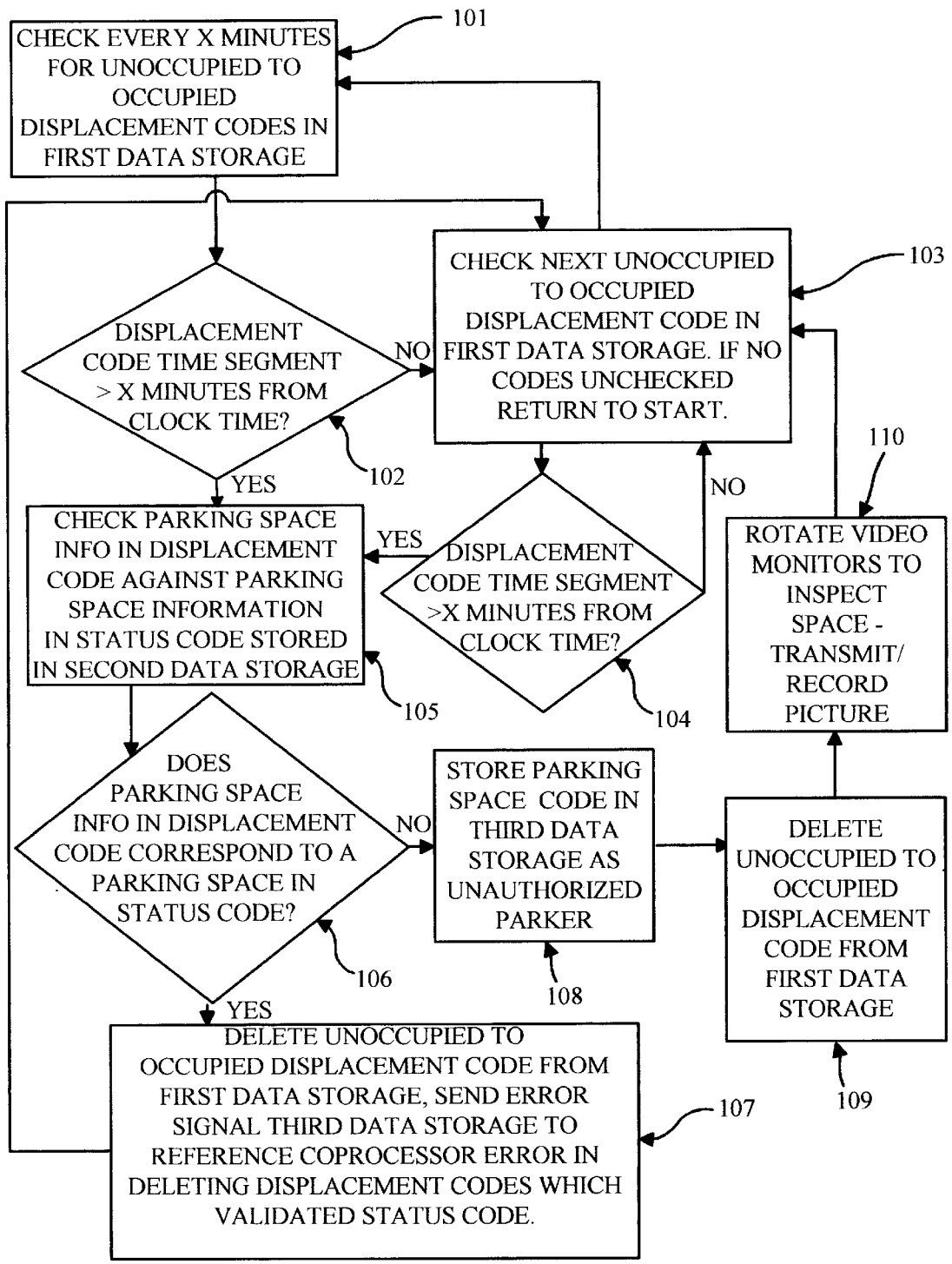
FIGS. 9a–9b is a flowchart of an operational routine utilizable in the processor of the embodiment set forth in FIG. 1.
Figure 9B:
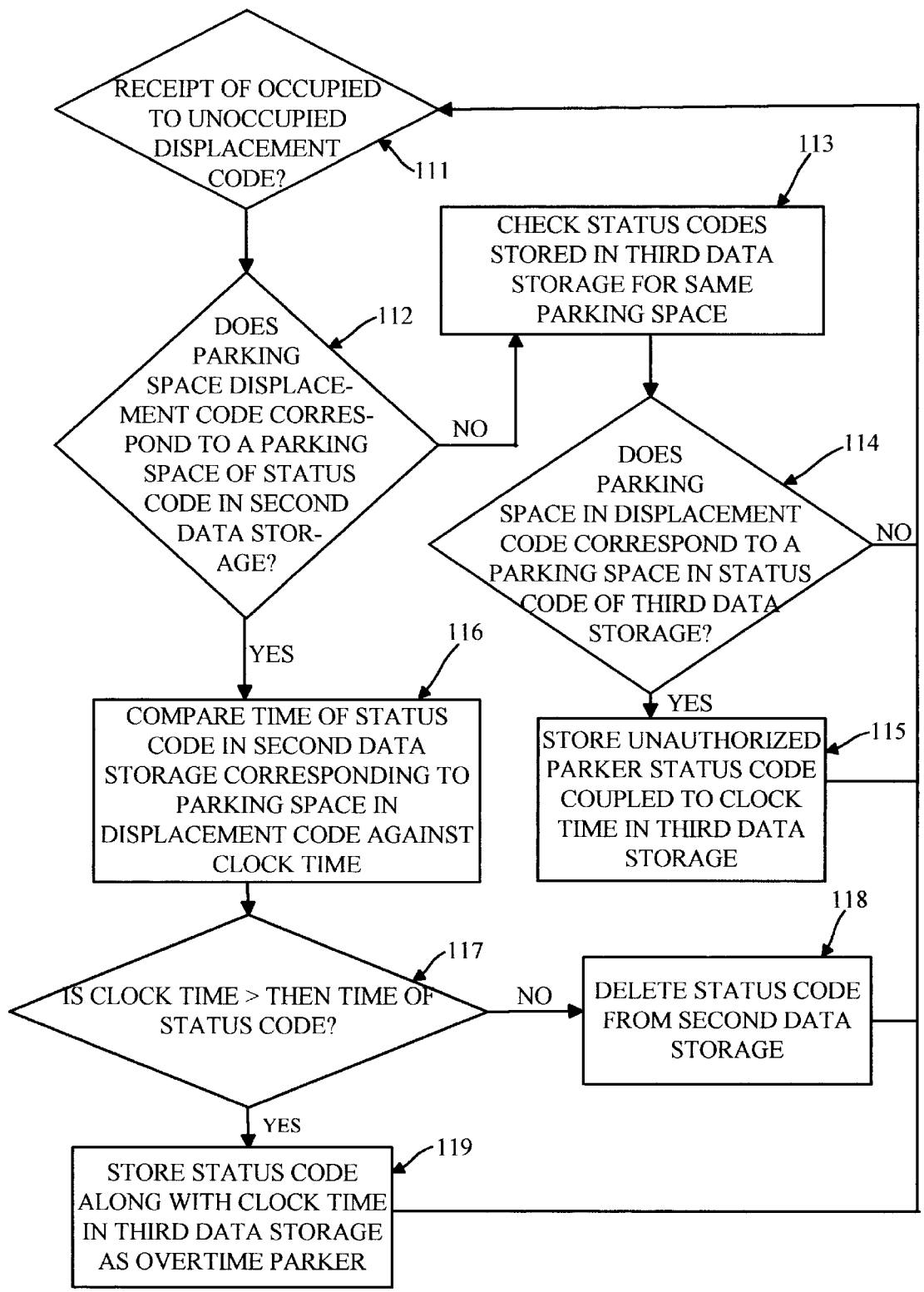

Referring now to FIG. 9b, there is shown a flowchart of an operational routine utilizable by the processor 20 upon receipt of occupied-to-unoccupied displacement data from coprocessor 31 with respect to a particular parking space. Processor 20 compares such input with status code stored in the second data storage means and confirms that the clock time is less than the expiration time encoded in the status code. If the clock time is more than the expiration time encoded in the status code, then processor 20 stores the code along with the clock time in third data storage means 21 as "overtime parker" data. If processor 20 determines that the parking space from which the displacement code was generated contains an unauthorized parker, processor 20 may couple the clock time to the unauthorized parker data stored in third data storage means 21, such that the time of unauthorized parking may be later determined.

As illustrated at FIG. 9b, at Step 111 there is determined if there is receipt of an occupied to unoccupied displacement code. If there is receipt of such code, the determination is subsequently made as to whether the parking space displacement code corresponds to a parking space of a status code in the second data storage (Step 112). If the displacement code does not correspond to a parking space of a status code in the second data storage a check is undertaken to determine if the status codes stored in the third data storage contain a code corresponding to the parking space (Steps 113 and 114). If no corresponding status code is detecting in the third data storage then the determination of whether an occupied to unoccupied displacement code has been received is re-undertaken (Step 111). If a corresponding status code is detected in the third data storage area, an unauthorized parker status code coupled to the clock time is stored in the third data storage area (Step 115) and the inquiry of Step 111 re-undertaken. On the other hand, if there is a determination that the parking space displacement code corresponds to a parking space of a status code stored in the second data storage (Step 112) the time of the status code in the second data storage corresponding to the parking space in the displacement code is compared against the clock time (Step 116). If the clock time is found to be greater than the time encoded in the status code (Step 117), the status code is stored along with the clock time in the third data storage as an overtime parker (Step 119) and the inquiry of Step 111 re-undertaken. If, however, the clock time is not greater than the time encoded in the status code (Step 117) then the status code is deleted from the second data storage (Step 118) and the inquiry of Step 111 re-undertaken. As FIG. 9a schematically represents, processor 20 further periodically checks displacement codes inputted in first data storage means 30 within a specified time frame for unoccupied-to-occupied displacement codes and correlates the same to status codes stored in second data storage means 18. If a parking space fragment of the status code stored in second data storage means does not correspond to the parking space fragment of the unoccupied-to-occupied displacement code, then processor 20 stores the displacement code in third data storage means 21 as "unauthorized parker" code. Third data storage means 21 may be coupled to external read port 22 permitting external reading of "unauthorized parker" and "overtime parker" code, as well as an error codes that may also be stored therein.

As illustrated at FIG. 9a, a check is made every X minutes to determine whether the time segment of the unoccupied to occupied displacement codes stored in first data storage is greater than X minutes from the actual clock time (Steps 101 and 102). If no one time segment is greater than X minutes from the actual clock time then the next unoccupied to occupied displacement code stored in fist data storage is checked (Steps 103 and 104). If no displacement code stored in fist data storage is found to contain a segment greater than X minutes from the actual clock time, the next unoccupied to occupied displacement code in first data storage is checked to determine if the displacement code time segment is greater that X minutes from clock time. If no displacement code in first data storage is unchecked then the inquiry at Step 101 is re-undertaken. If a displacement code in the first data storage is found to contain a time segment greater than X minutes from clock time then a check is performed of the parking space information stored in the displacement code against the parking space information in the status code stored in the second data storage (Step 105). If the parking space information in the displacement code corresponds to a parking space segment in the status code (Step 106) then the unoccupied to occupied displacement code from the first data storage is deleted, and an error signal is sent to the third data storage to reference a coprocessing error in deleting displacement codes which validated the status code (Step 107), If the parking space information in the displacement code does not correspond to a parking space in the status code, then the parking space code is stored in the third data storage as an unauthorized parker (Step 108) and the unoccupied to occupied displacement code from the fist data storage is deleted (Step 109) and video monitors are rotated to inspect the space and transmit or record a picture of the vehicle parked in such space (Step 110). The inquiry of Step 103 is subsequently re-undertaken.

Figure 2:
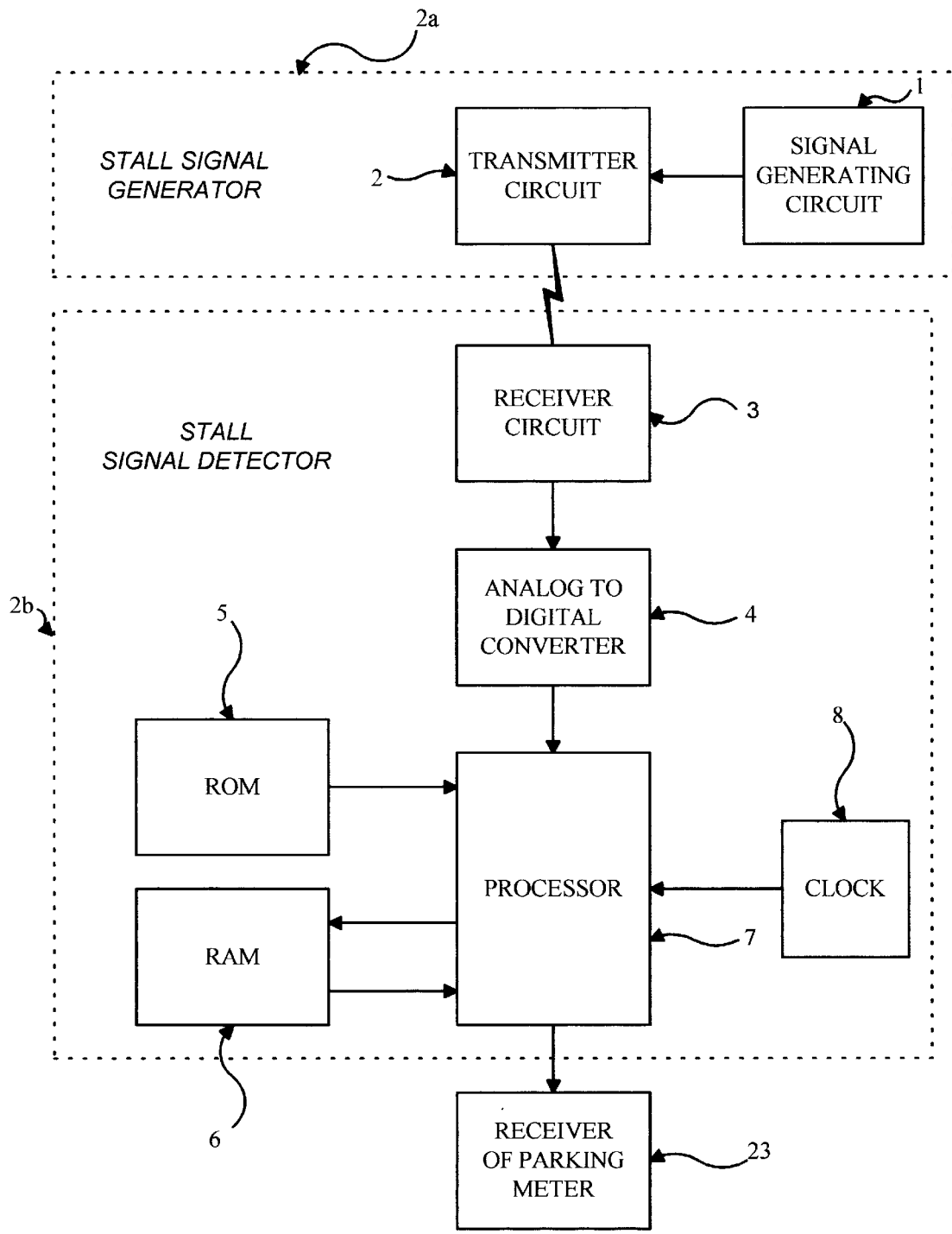
FIG. 2 is a block diagram of a displacement monitoring system coupled to a parking meter.

Now referring to FIG. 2, there is shown a block diagram of a displacement monitoring system coupled to a parking meter of the present invention. Displacement monitor system comprises stall signal generating means 2a and stall signal detector means 2b. Stall signal generating means 2a comprises signal generating circuit 1 for generating a signal, such as a wave signal, and transmitter circuit means 2 for directing and transmitting the generated signal to receiver circuit means 3 of stall signal detector 2b. Receiver circuit means 3 captures the signal from transmitter circuit 2, and by means of analog-to-digital converter 4 converts the signal to a digital datastream for input into stall detector processor 7. Processor 7 stores the digital input in RAM 6 and by means of a program stored in ROM 5 processes the input and couples it to identifying parking space information and to present time data, which may be provided by input from clock 8, as displacement data. Such displacement data is sent as input to parking meter receiver 23.

Figure 3:
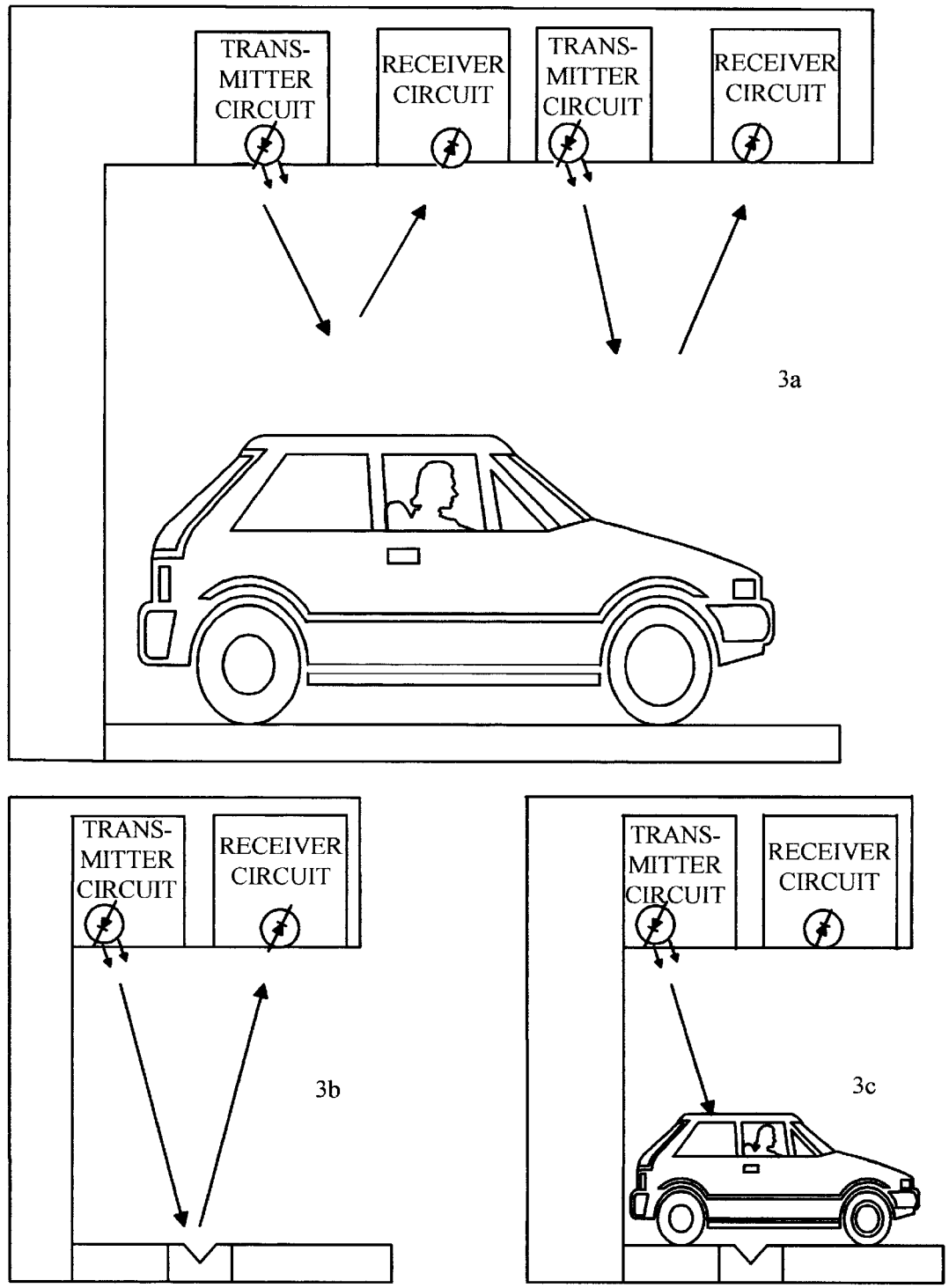
FIGS. 3a–3c is a schematic illustration of two displacement monitoring systems of the present invention.
Figure 5:
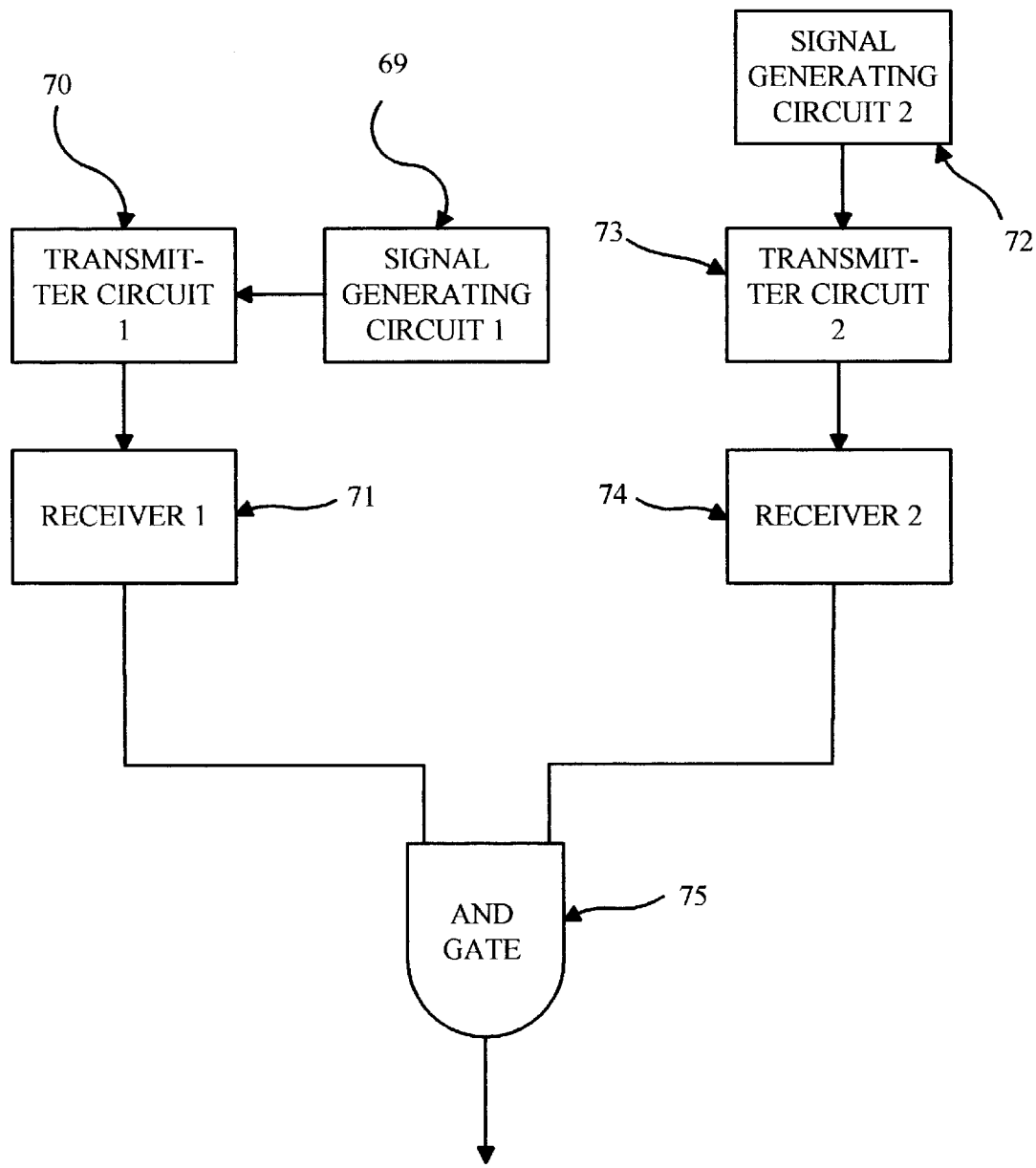
FIG. 5 is a block diagram of a displacement monitoring system requiring activation of two triggering systems for recording of a displacement.

FIGS. 3a–3c is a schematic illustration of an embodiment of the displacement monitoring system of the present invention. As seen in FIG. 3a, the displacement monitoring system may comprise a plurality of transmitter and receiver circuits disposed superior to the parking spot. As illustrated, each transmitter circuit outputs a signal which is received by a paired receiver circuit when a vehicle is parked in the space due to reflection of the signal from the vehicle to the receiver. The superior positioned transmitter and receiver circuits are preferably spaced laterally to such an extent that receipt of signal by all receiver circuits requires an article of roughly the length of a car to be parked in the space. FIG. 5 illustrates in block diagram form a displacement monitoring system requiring activation of a plurality of receivers for recording of a displacement by employing an "and gate" in the circuitry. As illustrated in FIG. 5, 'Signal Generating Circuit 1' 69 generates a signal upon activation which is passed to 'Transmitter Circuit 1' 70, which upon receipt of such signal transmits a signal which is received by 'Receiver 1' 71 which is connected to 'And Gate' 75. Similarly, 'Signal Generating Circuit 2' 72 generates a signal upon activation which is passed to 'Transmitter Circuit 2' 73, which upon receipt of such signal transmits a signal which is received by 'Receiver 2' 74 which is connected to 'And Gate' 75. 'And Gate' 75 passes signal only upon receipt of signal from 'Receiver 1' 71 and 'Receiver 2' 72. FIG. 3b illustrates another embodiment of the displacement monitoring system of the present invention. As seen in FIG. 3b, the transmitted signal can be reflected off a reflective spot in the parking space pavement to the receiver. In such embodiment, parking of a vehicle in the space FIG. 3c disrupts, rather than initiates as in FIG. 3a, receipt of transmitter signal by the receiver.

Figure 4:
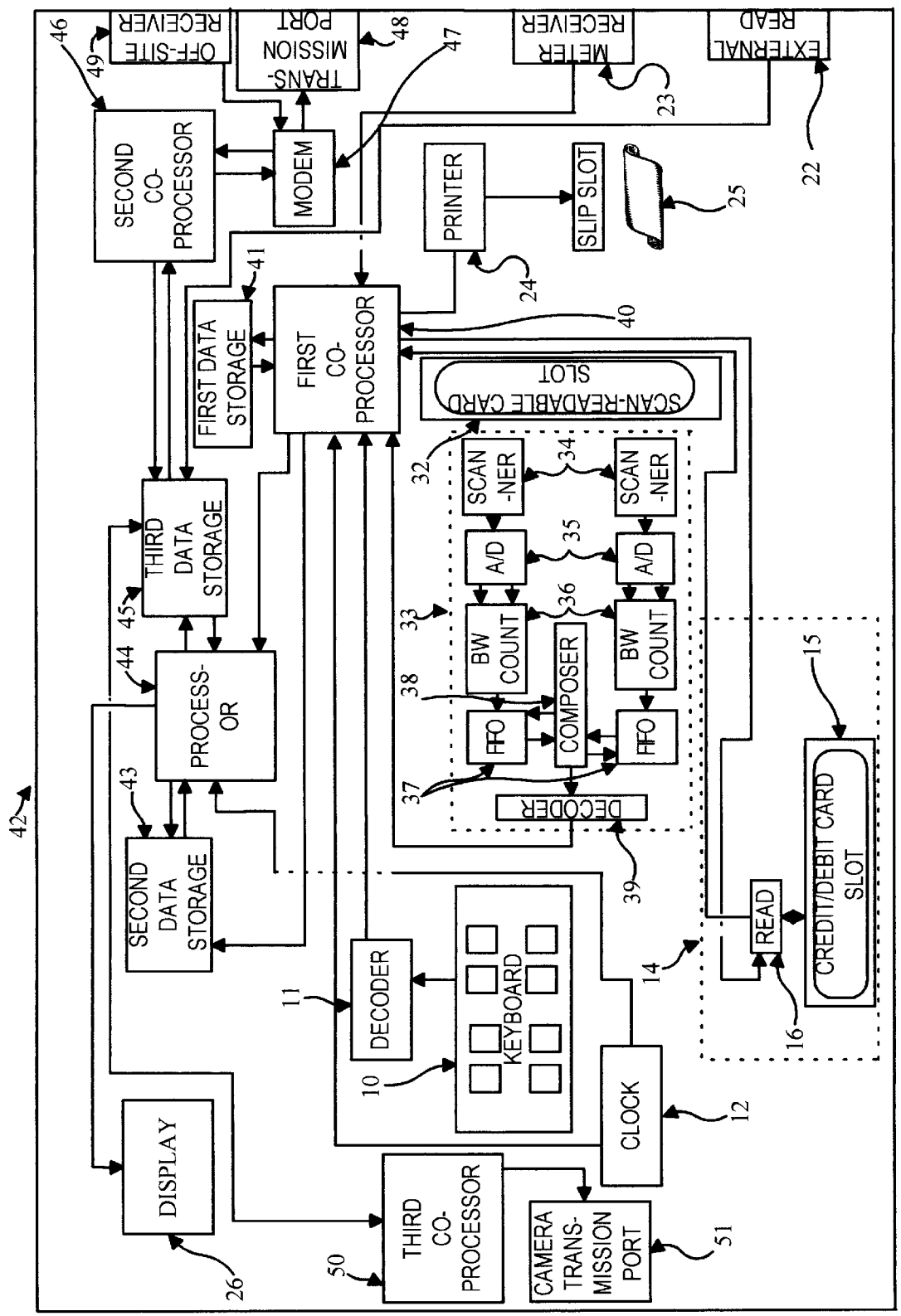
FIG. 4 is a block diagram of another embodiment of the parking meter of the present invention.

FIG. 4 is a block diagram of a another embodiment of the parking meter of the present invention. As contrasted to parking meter 19, parking meter 42 comprises coprocessor 40 (which operates in the manner of coprocessor 31) coupled to first data storage 41 (which operates in the manner of first data storage 30) and second data storage 43 (which operates in the manner of second data storage 18), such second data storage 43 being connected to processor 44 (which operates in the manner of processor 20) and third data storage 45 (which operates in the manner of third data storage 21), and further comprises second coprocessor 46, modem 47, transmission port 48, off-site receiver 49, third coprocessor 50, and camera transmission port 51. Second coprocessor 46 is programmed to periodically transfer information pertaining to unauthorized parkers and parking violators to an off-site installation by means of modem 47. Connection with the off-site installation is by way of transmission port 48. Second coprocessor 46 is in further communication with the off-site installation by means of input signal applied through off-site receiver 49 through modem 47. Such communications include commands to cause second coprocessor 46 to access third data storage unit 45 and to transmit data to the off-site installation. Modem 47 acts as the main control for the remote system. It acts to receive calls and for processing commands sent to it by the off-site installation. It contains ROM memory which contains the software and parameter memory for operating the remote system. Parking meter 42 further comprises third coprocessor 50 which receives data streams from processor 44, as set forth in the flowchart of FIG. 9a, pertaining to unauthorized parkers and processes the same such that input can be sent via camera transmission port 51 to video monitors such that they can be directed at the parking spaces in which the unauthorized parkers have parked.

Figure 7:
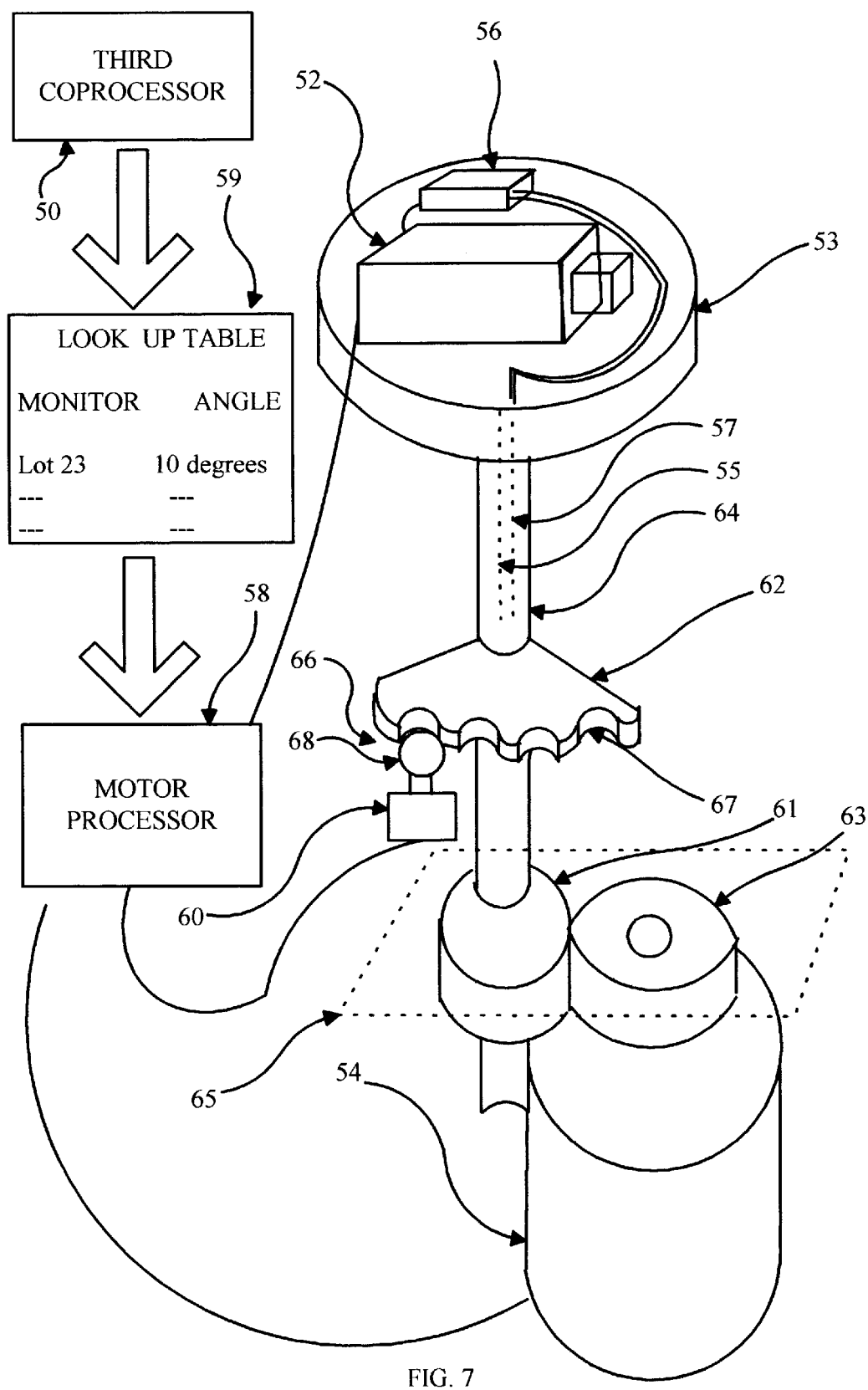
FIG. 7 is a perspective view of a stall video monitor of the present invention permitting visual inspection of a vehicle parked in a parking space.

Now referring to FIG. 7, there is shown a perspective view of a stall monitor permitting visual inspection of a vehicle parked in a parking space. Video monitor 52 is positioned on rotational base 53 the motion of which is controlled by motor 54. Motor 54 receives directional input from motor processor 58, which receives directional input from third coprocessor 50 after consultation with look-up table 59 with respect to the degree of turn necessary for the video monitor to be directed at the parking space. Motor processor 58 further provides input to video monitor 52 to activate the monitor. Activation of video monitor 52 may further be controlled by off-site communication with the monitor by means of monitor processor 56 with input communication line 57 and output communication line 55. Rotatable shaft 64 is journaled at one end to housing 65 and the other end to rotational base 53 and is disposed in perpendicular orientation to rotational base 53. A pair of mating gears 61 and 63 are disposed upon rotatable shaft 64 and motor 54, respectively, and are preferably dissimilar in size to provide a gear-reduction ration. By such arrangement, rotational base 53 and video monitor 52 are driven by the combination of rotational shaft 64, mating gears 61 and 63, and motor 54, providing unidirectional rotational movement. To provide an electrical logic signal indicating the relative position of rotational base 53, an angle encoder mechanism 66 comprising angle encoder plate 62 and detent mechanism 60 is provided. Angle encoder plate 62, shown in part in FIG. 7, is semi-circular in configuration and is equipped with a plurality of detents 67, each detent being situated a set number of degrees apart along an arcuate perimeter of the plate. At least one detent is used to orient rotational base 53 to a reference position. Each detent is semi-circular in configuration, having a diameter which cooperates with a roller 68. Roller 68 is perpendicular to the detents and is pressed by a spring (not shown) against each detent when rotational base 53 is snapped into a detent position, by motor 54 driving gears 61 and 63. Roller 68 rides along the edge of angle encoder plate 62 and then snaps into a detent 67, creating a retarding force opposing the momentum of rotational base 53 when it is in transition from one detent position to another. At each detent 67 position an electrical logic signal is generated by a detent mechanism switch (not shown) in detent mechanism 60, the signal being indicative of the position of rotational base 53. Action of roller 68 extending into a detent position causes the internal contacts of detent mechanism switch to close due to the mechanical linkage between roller 68 and the detent mechanism switch. The logic signal generated by detent mechanism switch is utilized by a motor processor 58 to accurately determine the position of rotational base 53 in order to determine the position in which video monitor 52 is directed.

Figure 6:
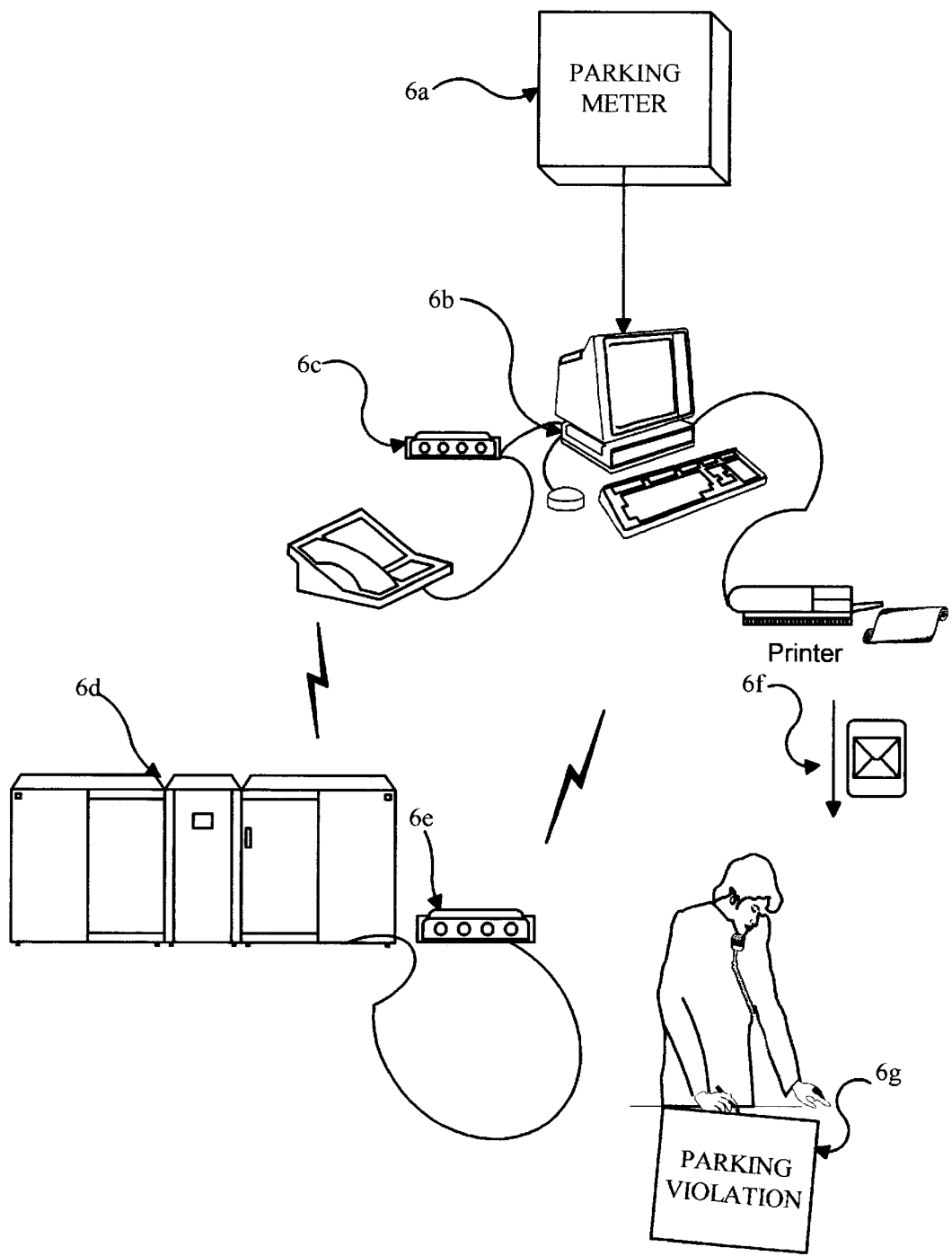
FIG. 6 is a schematic flow diagram of the ticketing function of the present invention.

And now referring to FIG. 6, there is shown a schematic flow diagram of an embodiment of the ticketing function system of the present invention. Data pertaining to parking violators are sent or received from parking meter 6a and processed by off- or on-site processing means 6b to ascertain the identification data within each violator status code. Identification data is sent by means of modem 6c, or other suitable data transmission means, to a data storage unit 6d which correlates the identification data contained within the status code to personal identification information such as a home address. Such personal identification information is transmitted by data storage unit modem 6e, or other suitable data transmission means, to the off/on-site processing station. Such data is used by the off/on-site processing station to generate a ticket 6g, as by means of a printer, which may be transmitted to the violator by any of the means known in the art, including mail 6f.

Although specific embodiments of the present invention have been described in detail above, various modifications thereto would be readily apparent to one with ordinary skill in the art. All such modifications are intended to be included within the scope of the present invention as defined by the following claims.

I claim:
1. A parking meter for easing the identification of parking violators comprising:
   an electronic-reading means disposed within said parking meter for electronically reading and storing identification information incorporated into personalized media;
   an input means disposed within said parking meter for inputting information pertaining to the location of a parked car;
   a timing means disposed within said parking machine for determining the time of input into said input means and for keeping time;
   a payment means disposed within said parking machine for accepting payment for parking and for calculating authorized parking time based upon payment made;
   a display means disposed within said parking meter for displaying messages;
   an instruction set for prompting a parker to insert parker personalized media into said electronic-reading means, payment into said payment means and to input information pertaining to the location of a parked car by means of said input means;
   a first processing means disposed within said parking machine electronically coupled to said electronic-reading means, said input means, said timing means, said payment means and said display means;
   a first data processing memory storage means, coupled to said first processing means, for storing data processing instruction sets;
   a second data memory storage means, coupled to said first processing means, for storing processed inputted-data;
   a first processing means data processing instruction set stored in said first data processing memory storage means for causing said first processing means to determine parking expiration time from said input time determined by said timing means and said authorized parking time determined by said payment means, and for causing said first processing means to couple in a digital datastream identification information read by said electronic-means, the location of a parked car input by said input means and parking expiration time to form coupled identification-location-time data and further to cause said first processing means to store said coupled identification-location-time data in said second data memory storage means;
   a second processing means disposed within said parking machine electronically coupled to said timing means and said second data memory storage means;
   a third data processing memory storage means, coupled to said second processing means, for storing data processing instruction sets;
   a fourth data memory storage means, coupled to said second processing means, for storing processed data;
   a second processing means data processing instruction set stored in said third data processing memory storage means for causing said second processing means to compare the time of said timing means with the parking expiration time in said coupled identification-location-time data, and for storing coupled identification-location-time data corresponding to expired parking times in said fourth data memory storage means;
   a data memory storage access means, coupled to said fourth data memory storage, for permitting downloading of said expired coupled identification-location-time data from said fourth data memory storage, wherein said parking meter is connected to one or more parking space occupancy detection devices for detecting vehicular occupancy of a parking space, said parking space occupancy detection devices communicating with said first processing means; and wherein said parking meter has a first processing means data processing instruction set for coupling time of displacement information with respect to a vehicle within a parking space detected by said parking space occupancy detection device to said coupled identification-location-time data in said fourth data storage memory storage means.

2. The parking meter of claim 1 further comprising a processing means for determining the identity of the overtime parker from the coupled data stored in said fourth data memory storage.

3. The parking meter of claim 1 further comprising a means for comparing occupied parking space information with said coupled data stored in said second and fourth data memory storage to determine occupied parking spaces for which no payment or input has been made.

4. The parking meter of claim 1 wherein said first and second processing means are the same processing means.

5. The parking meter of claim 1 wherein said first, second, third and fourth memory storage means are the same memory storage means.

6. A method for easing the identification of parking violators comprising causing a parker to input a personalized medium housing parker identification information into a parking meter;

electronically reading said identification information from said personalized medium and converting the same into digital data;

causing said parker to input information into said parking meter pertaining to the parking spot in which such parker has parked a vehicle and converting said information into digital data;

causing said parker to input payment into said parking meter and converting the amount of said payment into digital data with respect to authorized parking time;

storing in digital data format in a memory storage means said identification information coupled with information pertaining to the parking spot in which such parker has parked a vehicle and the time for which parking is validated;

determining by a parking space occupancy detection device for detecting vehicular occupancy in the parking space, electronically communicating with said parking meter, if a vehicle remains parked in the parking spot for longer than the validated parking time for such parking spot;

determining the identity of the parker of the vehicle which has remained longer than the validated parking time for such parking spot by determining the identification information coupled to said parking spot information in said coupled information stored in said memory storage means.

7. An electronic-based parking meter of the prior art including an electronic device for reading charge information, and an electronic input device for entering a parking space for which parking is to be authorized, and communicating with a freestanding parking space occupancy detection device for detecting vehicular occupancy in the parking space having as an improvement a data instruction set for coupling and storing said charge information with information pertaining to the location of a parked car, and the actual time a vehicle has occupied a parking space, as determined from input from said freestanding parking space occupancy detection device, in memory storage.

* * * * *